(12) United States Patent
Kunz et al.

(10) Patent No.: US 6,213,486 B1
(45) Date of Patent: Apr. 10, 2001

(54) STEP ASSEMBLY WITH CONCEALED LOWER TREAD

(75) Inventors: James R. Kunz; Benjamin J. Boyce, both of Eugene; Malcolm M. Maccabee, Yoncalla, all of OR (US)

(73) Assignee: Kwikee Products Co., Inc., Cottage Grove, OR (US)

( * ) Notice: Subject to any disclaimer, the term of this patent is extended or adjusted under 35 U.S.C. 154(b) by 0 days.

(21) Appl. No.: 09/286,277

(22) Filed: Apr. 5, 1999

(51) Int. Cl.$^7$ ........................................................ B60R 3/02
(52) U.S. Cl. ............................................. 280/166; 280/163
(58) Field of Search ................................... 280/166, 163; 182/127, 91, 88

(56) References Cited

U.S. PATENT DOCUMENTS

| | | | |
|---|---|---|---|
| 2,436,961 | * 3/1948 | Gabriel | 280/166 |
| 2,682,671 | * 7/1954 | Faure | 5/92 |
| 3,008,533 | 11/1961 | Haberle . | |
| 3,330,577 | 7/1967 | Mills . | |
| 3,408,959 | * 11/1968 | Cripe et al. | 105/447 |
| 3,743,320 | * 7/1973 | Clark | 280/166 |
| 3,807,757 | * 4/1974 | Carpenter et al. | 280/166 |
| 3,876,230 | * 4/1975 | Phillips | 280/166 |
| 4,020,920 | * 5/1977 | Abbott | 182/19 |
| 4,106,790 | * 8/1978 | Weiler | 280/166 |
| 4,108,457 | * 8/1978 | Garret | 280/166 |
| 4,110,673 | * 8/1978 | Nagy et al. | 318/466 |
| 4,116,457 | * 9/1978 | Nerem et al. | 280/166 |
| 4,198,070 | * 4/1980 | Weiler | 280/166 |
| 4,424,751 | * 1/1984 | Blochlinger | 105/447 |
| 4,623,160 | * 11/1986 | Trudell | 280/166 |
| 4,720,116 | * 1/1988 | Williams et al. | 280/166 |
| 5,505,476 | * 4/1996 | Maccabee | 280/166 |
| 5,547,040 | * 8/1996 | Hanser et al. | 182/88 |
| 5,660,405 | * 8/1997 | Campbell | 280/166 |
| 5,803,475 | * 9/1998 | Dick | 280/163 |
| 5,876,051 | * 3/1999 | Sage, Sr. | 280/166 |
| 5,941,342 | * 8/1999 | Lee | 182/95 |
| 5,957,237 | * 9/1999 | Tigner | 182/127 |

* cited by examiner

Primary Examiner—J. J. Swann
Assistant Examiner—J. Allen Shriver
(74) Attorney, Agent, or Firm—Christensen O'Connor Johnson Kindness PLLC

(57) ABSTRACT

The step assembly (10) includes a housing (12) which is mountable to a recreational vehicle, typically underneath the door of the vehicle. A pair of linkage arms (14) and (16) are rotatably coupled at their lower ends to each side of the housing (12). The step assembly (10) contains an upper tread assembly (18), a center tread assembly (24), and a lower tread assembly (34), respectively including an upper step (20), a center step (28), and a lower step (40). The upper ends of the linkage arms (14) and (16) are rotatably connected to the upper portion of the upper tread assembly (18). The center tread assembly (24) is slidably engaged with the upper tread assembly (18) through a slideway assembly (26). The lower tread assembly (34) has a lower tread pivot arm (38) which is rotatably coupled to the center tread assembly (24) by a pin (30) mounted on the center tread assembly. The lower step (40) has a lower face (58) that substantially closes off the housing (12) when the step assembly is in a fully retracted position, forming a continuation of the vehicle outer surface. A linear actuator (42) is connected to the housing (12) and one of the tread assemblies, in order to extend and retract the tread assembly relative to the housing (12).

34 Claims, 8 Drawing Sheets

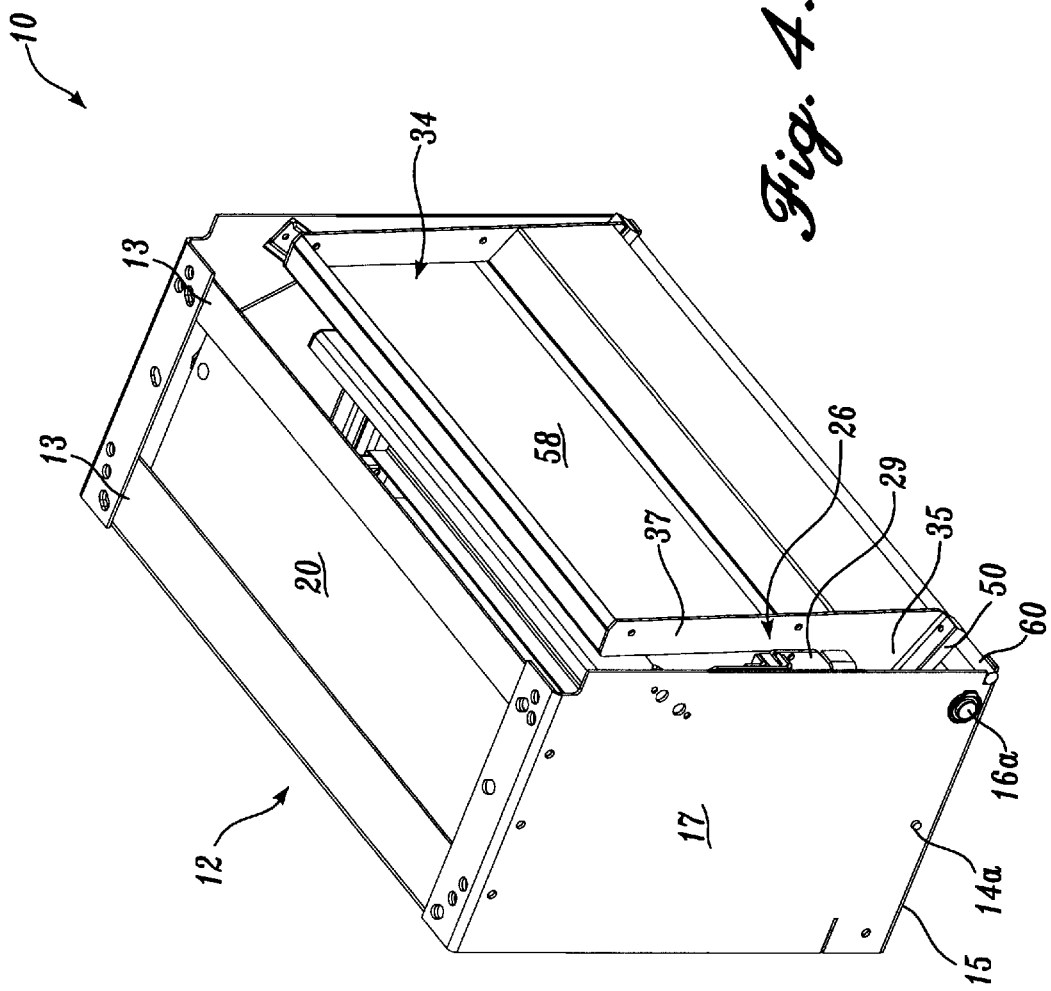

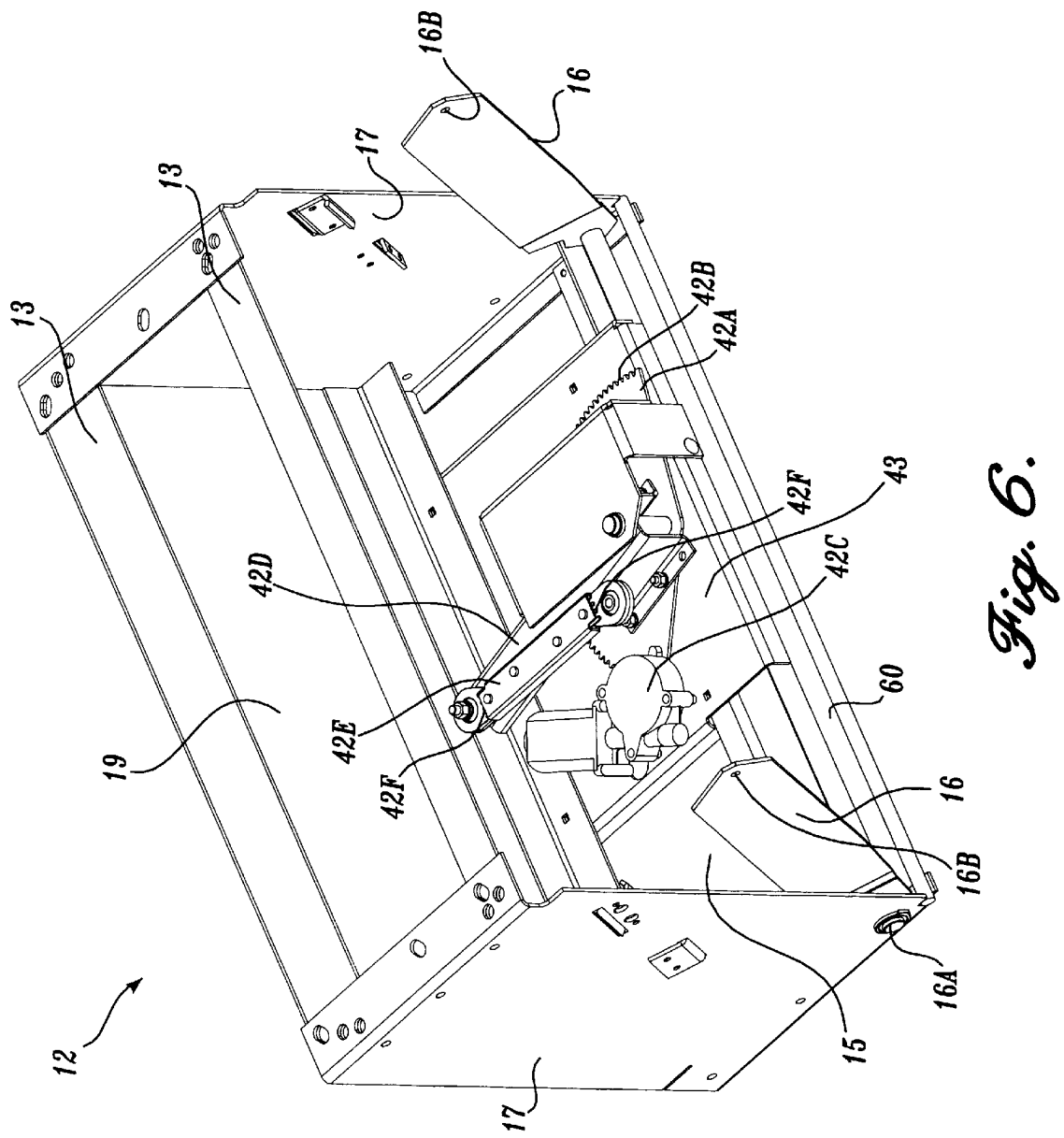

STEP ASSEMBLY WITH CONCEALED LOWER TREAD

FIELD OF THE INVENTION

The present invention relates to a step assembly for a recreational vehicle and more particularly to a step assembly that is self-concealing when in its fully retracted position.

BACKGROUND OF THE INVENTION

The doorway threshold of recreational vehicles is typically high above the ground. Access to these type of vehicles can be difficult and even unsafe, especially for older persons who often use such vehicles. A series of permanent steps attached beneath the doorway to permit easy access would not be practical, since the steps would decrease the effective clearance of the vehicles and extend the width or length of the vehicle as well.

The desirability of having steps for recreational vehicles that may be folded out of the way when not in use has long been recognized. Such steps should fold readily, store compactly, and permit easy safe access to the vehicle. The steps should not increase the overall width of the vehicle when not in use, since the vehicle frame may already extend to the maximum width allowed by regulation. The retracted width of the steps should be such that, when not in use, the rear of the steps do not interfere with the frame of the vehicle. The depth of the steps is another safety and easy of access consideration. Ideally, each step should be deep enough to permit the entire foot of the user to have tread access, not just the heel or toe of the foot, when both ascending and descending. This is especially important when descending, so that the user is kept from pitching forward.

Steps for recreational vehicles such as motor homes, campers, vans, and the like, have included in the past, positionable features to enhance both step function and step stowage when the vehicle is underway. For the most part, such step assemblies have been manually positioned, but some powered step assemblies are also known in the prior art. One drawback to known steps is their limited extension capability, resulting in a step having only limited step surface area and requiring great care on the user's part in boarding or departing the vehicle.

Designs have been developed in an attempt to address some of the above-described considerations. For example, U.S. Pat. No. 3,876,230 (Phillips) discloses foldable camper steps that pivot on one another until they reach a fully retracted position. Each of the steps is formed from an L-shaped member. However, several problems exist with the application of the Phillips step assembly to a recreational vehicle. The door of a recreational vehicle is typically on the side. As such, very little or no increase in width beyond the door can be allowed by the steps when they are not in use. The steps of the Phillips device, even when fully retracted, extend at least the width of one step beyond the door. Another problem with the Phillips steps is in the shallowness of the depth of the step treads. A user may not be able to fit his or her entire foot onto the tread.

U.S. Pat. No. 3,408,959 (Cripe et al.) discloses a folding staircase which functions as a raised step for use with high-level platforms, as well as a pair of steps for lower-level platforms. The Cripe step assembly includes an upper tread and a lower tread linked together and actuated by the flotation of a pivot arm and an associated link through a chain drive, powered by a motor. When these steps are in a fully retracted position, an outside wall or member forms a part of the exterior of the vehicle.

U.S. Pat. No. 4,106,790 (Weiler) discloses a retractable vehicle step that swings into a retracted position. The Weiler step is mounted on the side of a recreational vehicle and stowed beneath the door under the side of the vehicle when not in use. However, since only one steps is disclosed, safe and convenient access may be somewhat less than desirable. If the frame height of the step is kept within a reasonable range for ground clearance purposes, the distance from the step to the ground may be excessive. If the step did project lower, the distance from the door threshold to the step may be excessive.

U.S. Pat. No. 4,424,751 (Blöchlinger) discloses a step assembly for rail cars, which is raised and lowered by two parallel guide brackets. This step assembly contains an upper and a lower tread. When the lower tread is in its retracted position the bottom surface of the step conforms to the exterior of the rail car. However, the Blöchlinger step assembly does reduce the amount of usable floor space within the rail car due to the operation and structure of the step assembly.

U.S. Pat. No. 3,807,757 (Carpenter et al.) also discloses a step assembly for campers, trucks, and other recreational vehicles. The Carpenter step assembly has upper, center, and lower treads. When the step assembly is in its fully retracted position, the bottom of the lower tread faces outwardly. However, even in its fully retracted position the Carpenter step assembly does add additional width to the side of the recreational vehicle to which it is attached. As is typical in such step assemblies, the carpenter step assembly is rather unsightly when in a fully folded position.

The limitations of the above-described steps of the prior art are typical of current designs. The present invention was developed to effectively address the issues of convenience, safe access to recreational vehicles, and the maintenance of an aesthetically please exterior surface, while fitting within the constraints imposed by space limitations such as ground clearance, vehicle width, and small mounting areas.

SUMMARY OF THE INVENTION

The present invention is directed towards a step assembly that is self-concealing and which can be mounted to a recreational vehicle. The step assembly contains a mountable housing that fully encloses multiple tread assemblies that are nestable within the housing and are extendible therefrom. Attachment arms are pivotally connected to the housing. A linear actuator is also attached to the mountable housing. One of the tread assemblies is directly coupled to the linear actuator for translationally extending and retracting this directly coupled tread assembly relative to the housing. The other tread assemblies are operatively associated with the linear actuator through the directly coupled tread assembly for rotationally extending and retracting the other tread assemblies in conjunction with the translational extending and retracting the directly coupled tread assembly. The lowermost of the tread assemblies has a tread lower surface and retraction of the tread assemblies causes this tread lower surface to substantially conceal the step assembly within the mountable housing.

In a preferred embodiment of the present invention, the step assembly further contains a slideway assembly, which has portions that are mounted to the directly coupled tread assembly and portions that are mounted to one of the other tread assemblies. The slideway assembly allows the directly coupled tread assembly to be slidable relative to the other connected tread assembly. The tread lower surface of the lowermost tread assembly is designed to provide or accept an aesthetically appealing outer surface to the housing of the step assembly when the step assembly is fully retracted.

A step assembly constructed in accordance with the present invention uses a simple and efficient construction design and operating technique. This step assembly meets the space limitation requirements associated with recreational vehicles and is fully nestable with a housing to form an aesthetically pleasing continuation of the vehicle outer surface when retracted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 illustrates an elevated perspective view of the retractable step assembly of FIG. 2, shown with the step assembly in a fully retracted position.

FIG. 6 illustrates an elevated perspective view of the retractable step assembly of FIG. 2, shown with the tread assemblies removed and one possible embodiment of a linear actuator mounted near the bottom of the mountable housing in a fully retracted position.

DETAILED DESCRIPTION OF THE PREFERRED EMBODIMENT

Figure 1:
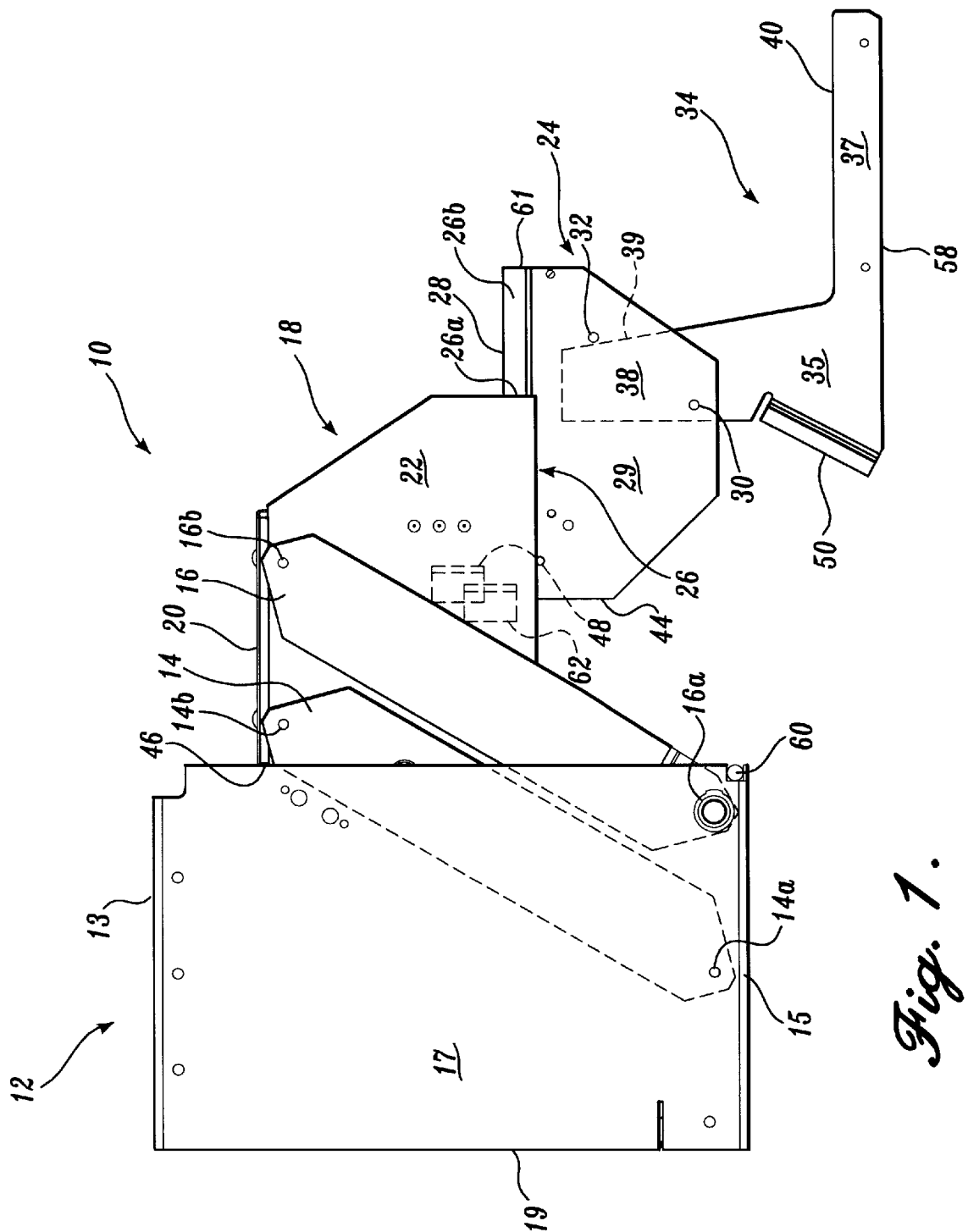
FIG. 1 illustrates a side view of a retractable step assembly of the present invention, shown with the step assembly in a fully extended position.

FIG. 1 illustrates a preferred embodiment of a step assembly 10 constructed in accordance with the present invention. The step assembly 10 includes a housing 12 which is mountable to a recreational vehicle, typically underneath a door of the vehicle. A pair of linkage arms 14 and 16 are rotatably coupled at their lower ends to each side of the housing 12, such that the linkage arms 14 and 16 pivot about axes 14a and 16a. The step assembly 10 further contains an upper tread assembly 18, a center tread assembly 24, and a lower tread assembly 34, respectively including an upper step 20, a center step 28, and a lower step 40. The upper ends of the linkage arms 14 and 16 are rotatably connected to the upper portion of the upper tread assembly 18 to pivot about axes 14b and 16b.

The upper portion of the center tread assembly 24 is slidably engaged with the lower portion of the upper tread assembly 18 through a slideway assembly 26. The center tread assembly 24 further contains rotational connection pins 30 for connection to the lower tread assembly 34, and a stop pin 32. The lower tread assembly 34 includes a lower tread pivot arm 38 which is rotatably mounted by the pins 30 to the center tread assembly 24. The lower step 40 of the lower tread assembly 34 has a lower face 58 that substantially closes off the housing 12 when the step assembly is in a fully retracted position, forming a continuation of the vehicle outer surface. As shown is FIGS. 5A–6, a linear actuator 42 is connected to the housing 12 and one of the tread assemblies (preferably the center tread assembly) which it powers, in order to extend and retract the center tread assembly relative to the housing 12.

Referring again to FIG. 1, the step assembly 10 of the present invention is preferably mountable on a horizontal undersurface of the recreational vehicle, beneath a vehicle access door and substantially flush with the vehicle sidewall. For the purposes of further description and understanding of spatial relations herein, the term "inward" will relate to locations toward the midsection of the recreational vehicle. The term "outward" relates to locations away from the midsection of the associated vehicle. Forward relates to the front end of the associated vehicle, and rearward relates to the intended rearward end of the vehicle. The description of the step assembly 10 of the present invention will be given in the above terms as if the step assembly 10 is mounted to the vehicle at a location under the vehicle and along the vehicle's side, below an access door. Thus, the step assembly will swing between an elevated, retracted, inward storage position and a downwardly extended, outward operative position. The operative position of the step assembly being outward of the storage position.

It should be understood that the orientations related above are given by way of example simply to aid description of the invention and to provide a correlation between the present invention and a recreational vehicle to which it may be mounted. The present invention could be mounted on a vehicle at locations other than the location exemplified herein, without departing from the scope of the present invention.

Figure 2:
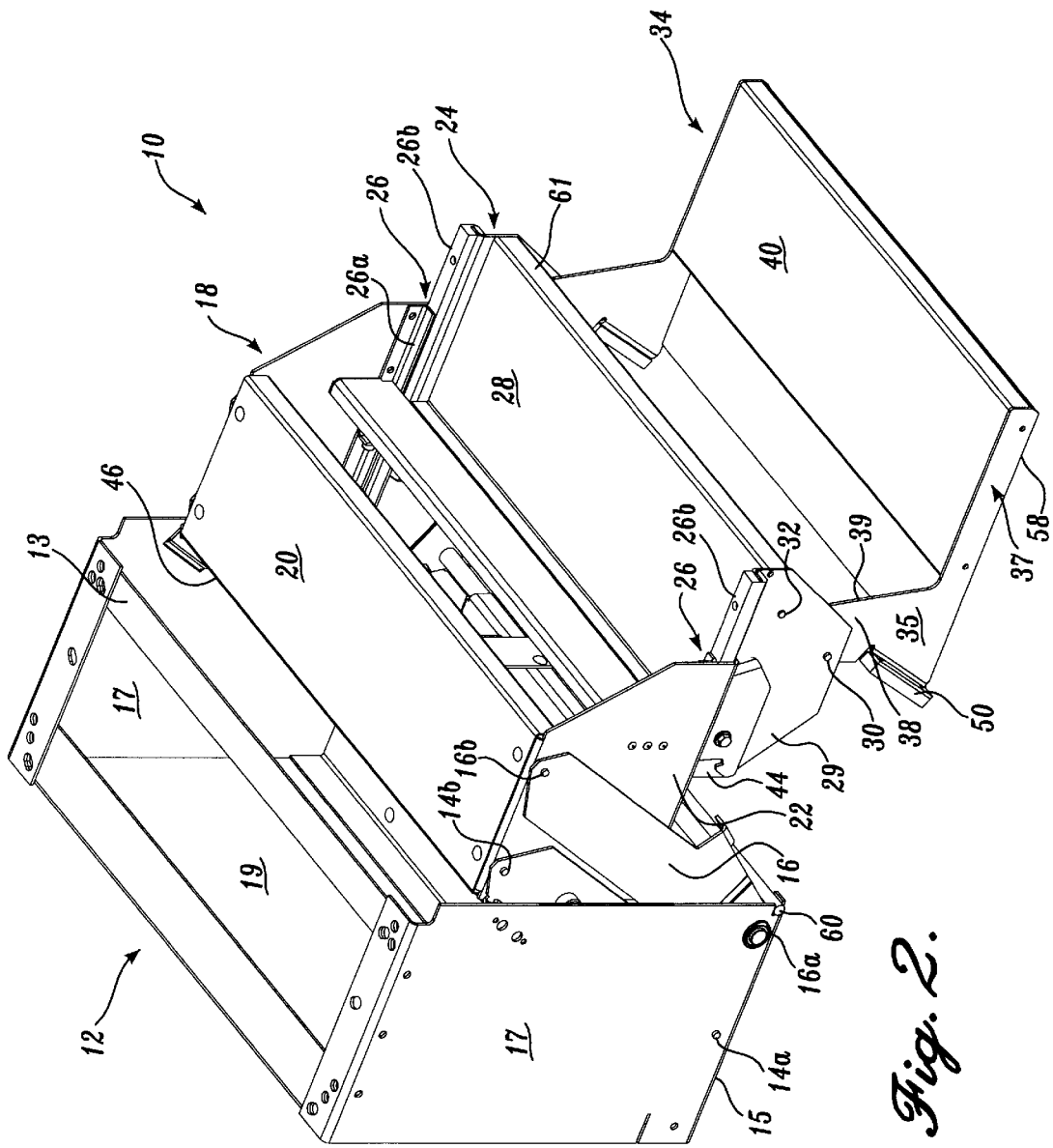
FIG. 2 illustrates an elevated perspective view of a retractable step assembly of the present invention, shown with the step assembly in a fully extended position.
Figure 3:
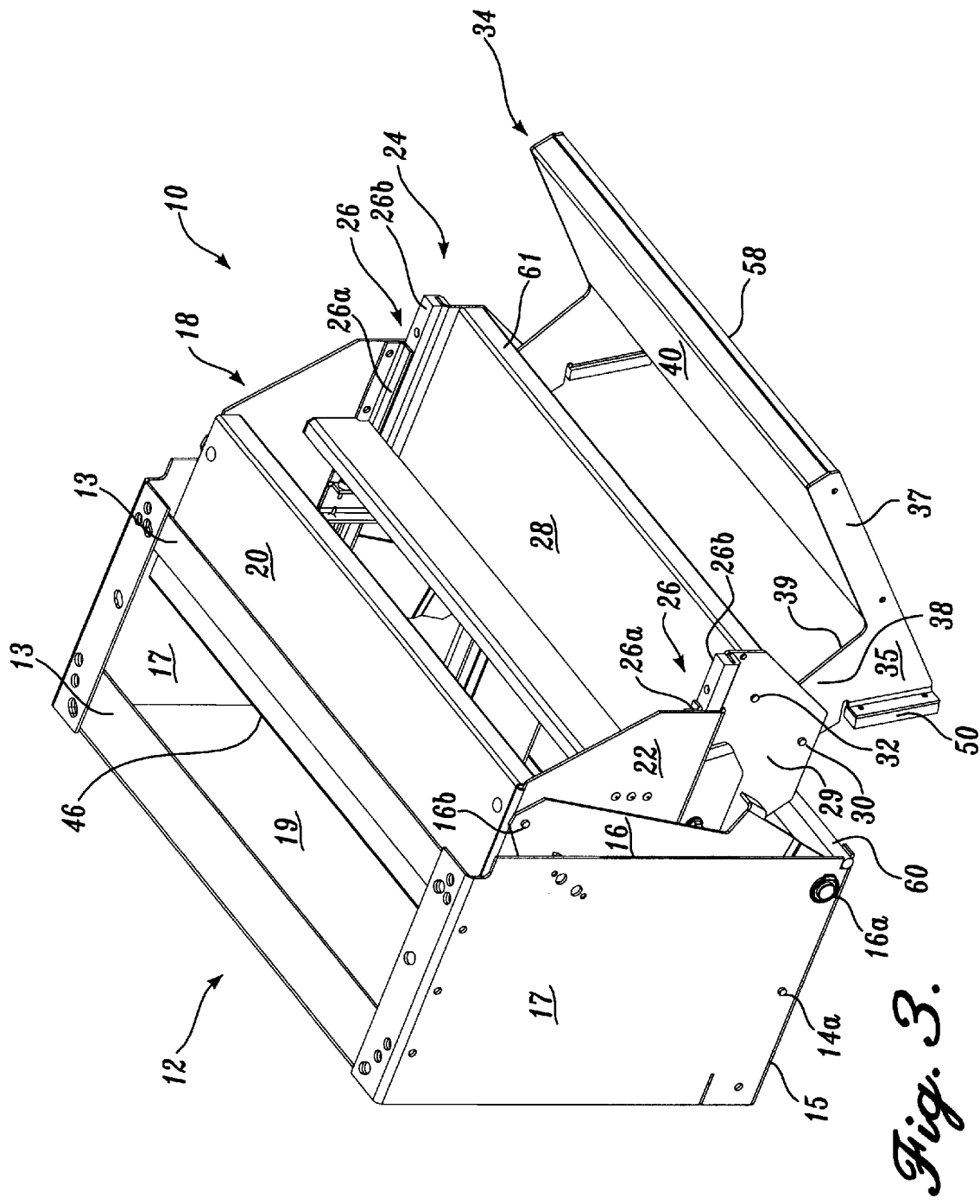
FIG. 3 illustrates an elevated perspective view of the retractable step assembly of FIG. 2, shown with the step assembly in a partially retracted position.

As shown in FIGS. 2–4, the housing 12 of the step assembly 10 is constructed to form an outwardly open-faced, generally rectangular-shaped box-like structure. The housing 12 preferably contains an upper wall 13, a lower wall 15, forward and rearward sidewalls 17, and an inward wall 19. The upper wall 13 and lower wall 15 are generally parallel to each other, as are the forward and rearward sidewalls 17. In a preferred embodiment of the present invention, the upper wall 13 of the housing 12 is secured to the underside of a recreational vehicle using any of a variety of known mounting techniques, including bolting, welding, etc. Preferably, the outward edges of the upper wall 13, lower wall 15, and forward and rearward sidewalls 17 are substantially flush with the vehicle sidewall in order to form a continuation of the vehicle outer surface.

A pair of outward and inward linkage arms 14 and 16 are rotatably connected parallel to each other at their lower ends to each of the forward and rearward sidewalls 17 of the housing 12. The linkage arms 14 and 16 connect to the sidewalls 17 near the intersection of the sidewalls 17 with the lower wall 15, where the arms pivot about axes 14a and 16a. The linkage arms 14 and 16 extend upwardly to the upper tread assembly 18, where the upper ends of the arms are rotatably pinned, and pivot about axes 14b and 16b. The orientation of the linkage arms 14 and 16 changes during the extension of the step assembly 10 from an upwardly projecting inward position (FIG. 4) when the step assembly is in its retracted position, to a diagonally extended outward position when the step assembly is in its extended position (FIGS. 1 and 2).

The upper tread assembly 18 includes an upper step 20 at the top region of the upper tread assembly, which connects to forward and rearward upper tread sidewalls 22. The upper ends of the linkage arms 14 and 16 connect to the upper tread assembly 18 toward the upper ends of the upper tread assembly sidewalls 22, where pivot axes 14b and 16b are located. The upper tread assembly 18 is slidably connected to the center tread assembly 24 through a slideway assembly 26.

The slideway assembly 26 connects the lower portion of the upper tread assembly 18 to the upper portion of the center tread assembly 24. A wide variety of sliding engagement devices are known in the art and are adequate for use in the present invention. Such sliding engagement devices are typically used with objects such as retractable computer trays and sliding desk drawers. An exemplary slideway assembly 26 contains outer slide tracks 26A that are secured to the lower portion of the upper tread assembly 18, and correspondingly shaped inner slide tracks 26B that are mounted to the upper portion of the center tread assembly 24. The inner slide tracks 26B are shaped and sized to compatibly engage within the aforementioned outer slide tracks 26A. A bearing system (not shown) or other roller mechanism is fixedly secured between the outer and inner slide tracks 26A and 26B in order to produce a low friction sliding arrangement between the slide tracks. Stops (not shown) are located at the end of the bearing systems to prevent overextension of the slideway assembly 26. Further, the location of the outer slide track 26A and the inner slide track 26B can be reversed without departing from the scope of the present invention.

The center tread assembly 24 includes a center step 28 and forward and rearward center tread sidewalls 29. Rotational connection pins 30 and a stop pin 32 are mounted on the sidewalls 29 of the center tread assembly. The lower tread assembly 24 is rotatably mounted to the center tread assembly 34 by the rotational connection pins 30.

The lower tread assembly 34 includes a lower step 40 at the lower region of the tread assembly spanning between the sidewalls 35 of the lower tread assembly. The sidewalls 35 are generally planar and formed in a generally "L" shape, composed of a pivot arm section 38 and a tread support section 37. The pivot arm section 38 is coupled to the center tread assembly 24 at the rotational connection pins 30. The pivot arm section 38 has an outward edge 39 that abuts the stop pin 32 mounted on the center tread assembly 24, when the lower tread assembly 34 is in its extended position to prevent further downward rotation of the lower tread assembly 34 about the axis of the rotational connection pins 30. The lower tread assembly 34 has a decoratively finished lower surface 58. Alternatively, the lower surface may be adapted to accept a panel that matches or complements the exterior of the vehicle on which the step assembly is mounted. When the step assembly 10 is in its fully retracted position (FIG. 4), this lower surface 58 forms an aesthetically pleasing outward wall to the housing 12.

Figure 5A:
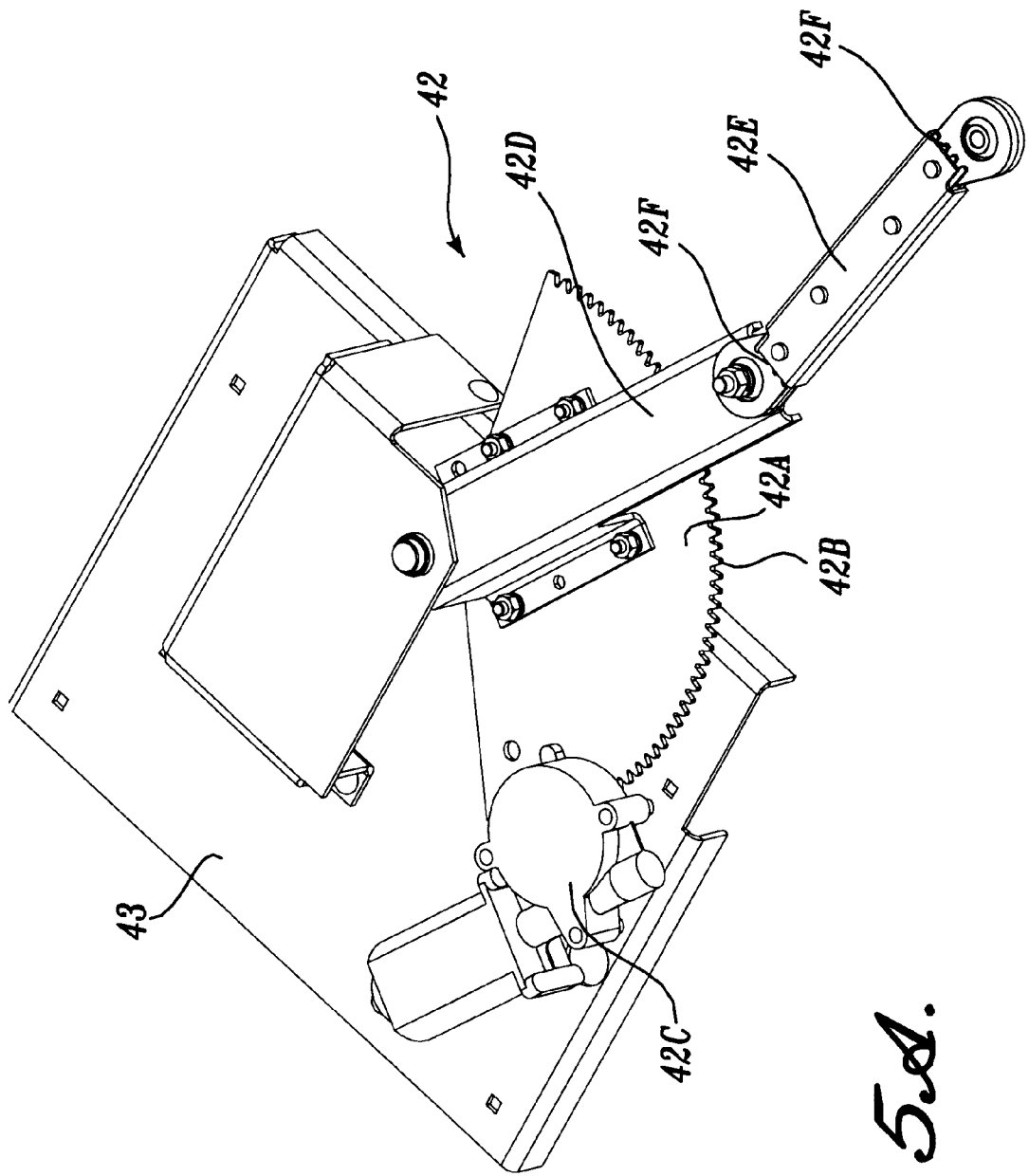
FIG. 5A illustrates an isolation view of one possible embodiment of a linear actuator of the present invention, shown mounted near the bottom of the mountable housing and in a fully extended position.
Figure 5B:
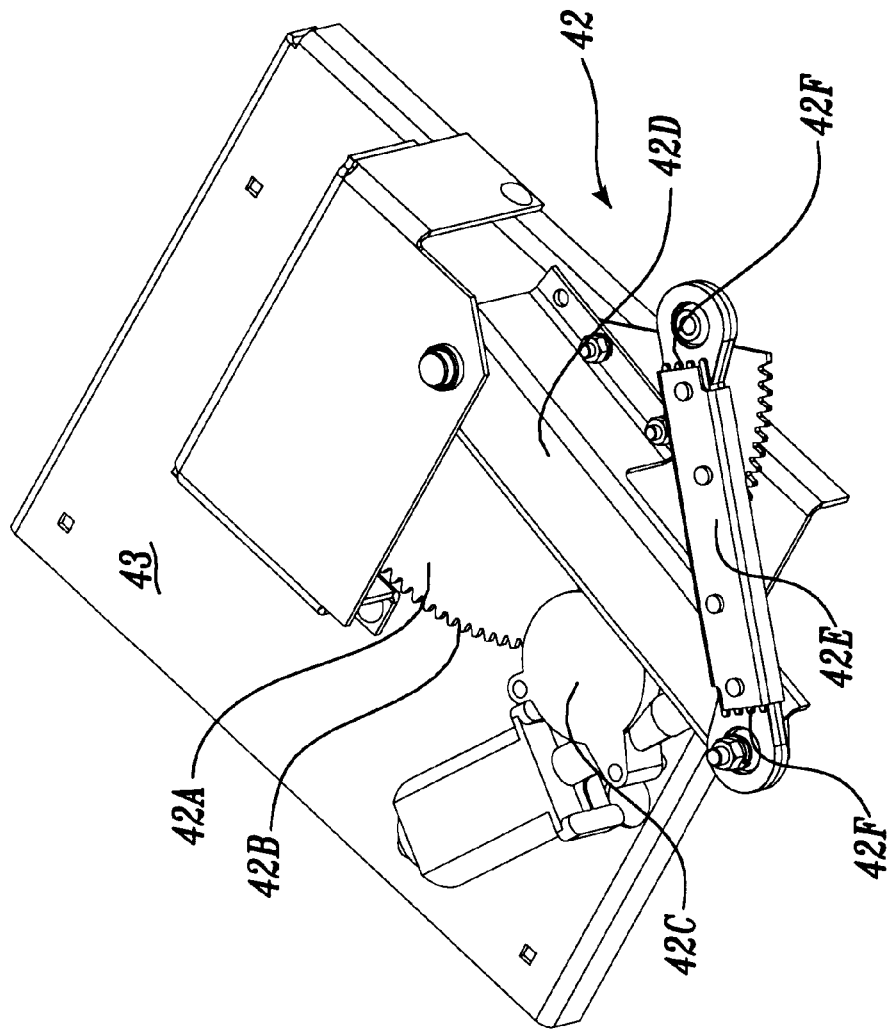
FIG. 5B illustrates an isolation view of one possible embodiment of a linear actuator of the present invention, shown mounted near the bottom of the mountable housing and in a partially retracted position.
Figure 5E:
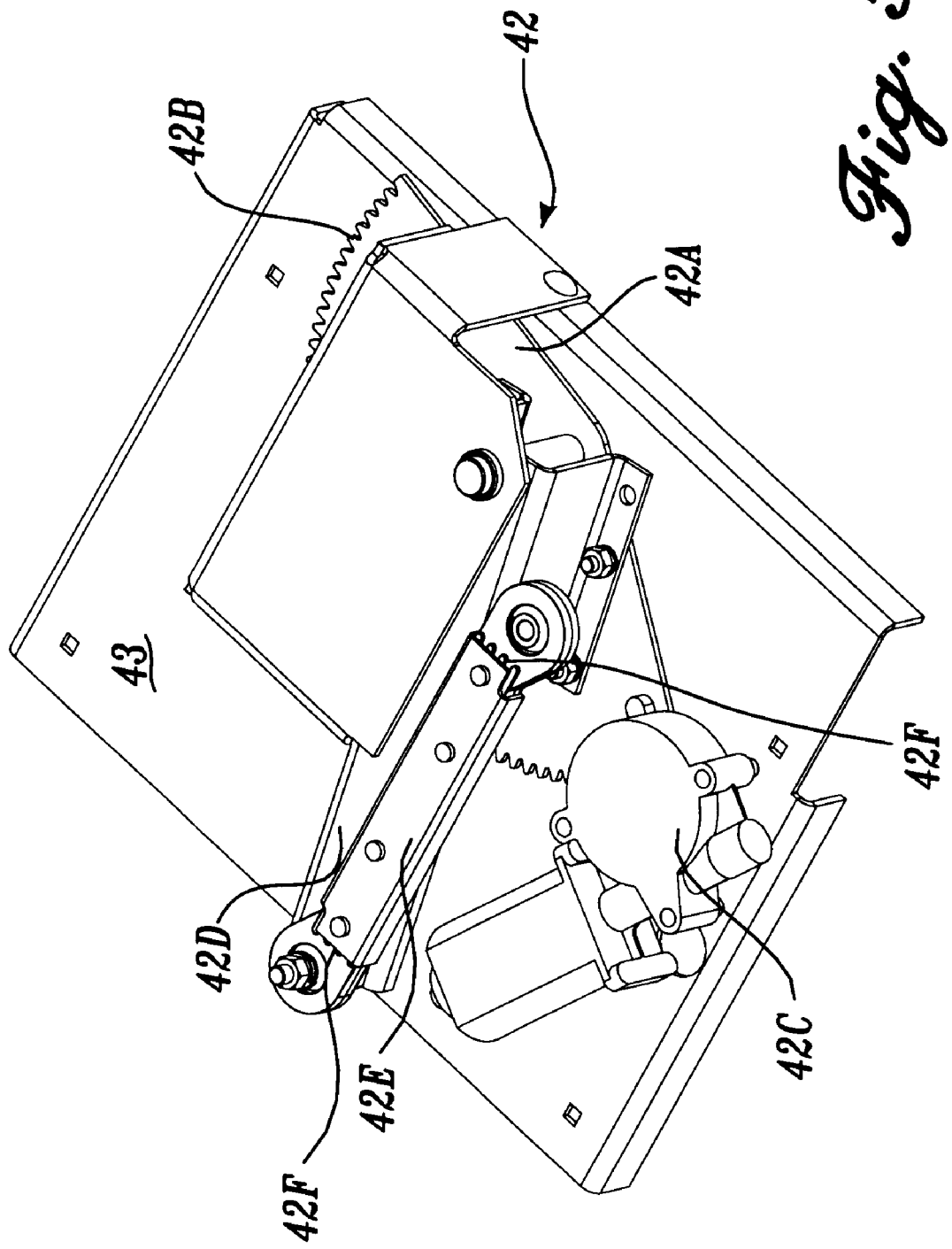
FIG. 5C illustrates an isolation view of one possible embodiment of a linear actuator of the present invention, shown mounted near the bottom of the mountable housing and in a fully retracted position.

As shown in FIGS. 5A–6, the center tread assembly 24 is powered by a linear actuator 42, that extends and retracts the center tread assembly relative to the housing 12. Any number of known mechanical configurations can be utilized to embody the linear actuator 42 which are known in the art. In one exemplary embodiment, the linear actuator 42 is configured in the form of a gear drive assembly. In this particular embodiment, the linear actuator 42 includes a rotatable gear segment 42A having a toothed outer periphery 42B, a motorized engagement pinion 42C, a fixedly secured rotatable gear segment arm 42D, a coupling linkage 42E, and a pivoting ball joints 42F.

The gear segment 42A is rotatably secured to a mounting wall 43, and has a circular segment-shaped, toothed outer periphery 42B that meshes with the motorized engageable gear pinion 42C. The mounting wall 43 is in turn substantially horizontally secured to the housing 12 near the lower wall 13 (as shown in FIG. 6). The gear segment arm 42D is affixed to the gear segment 42A and rotatably secured mounting wall 43 about the same pivot point as the gear segment 42A. The distal end of the gear segment arm 42D is rotatably and pivotally secured to one end of the coupling linkage 42E through a pivoting ball joint 42F. The coupling linkage 42E is in turn rotatably and pivotally secured at its other end in the central region of the lower surface of the center tread assembly 24 (not shown) through a second pivoting ball joint 42F.

FIGS. 5A–C illustrate the retraction/extension of the linear actuator 42. Simply stated, the motorized engagement gear pinion 42C rotates the gear segment 42A through meshing rotational engagement. The gear segment arm 42D, being secured to the gear segment 42A, rotates in turn with the movement of the gear segment 42A. The rotational movement of the distal end of the gear segment arm 42D from its inwardmost position to its outwardmost position, forces the center tread assembly 24 outward by way of the coupling linkage 42E. The coupling linkage 42E allows the rotational outward motion of the gear segment arm 42D to be translated into linear outward motion in the center tread assembly 24, which is locked into following a linear path by the slideway assembly 26. The pivoting ball joints 42F, allow the coupling linkage 42E to pivot in a vertical plane while rotating in a horizontal plane; thus, providing the requisite mobility needed by the center tread assembly 24 which moves in a mild vertical arching motion during its extension and retraction. Opposite rotation of the motorized engageable gear pinion 42C will act to retract the center tread assembly 24 in the reverse of the above-described motion.

Any number of known means can be used to power the linear actuator 42, including electrical, hydraulic, pneumatic, solar, etc. without departing from the scope of the present invention. Further, the linear actuator 42 may be designed to be selectively activated, such as by a push button which activates extension or retraction of the step assembly 10, or automatically such that a specific action, such as by opening or closing the access door, triggers the extension and retraction of the step assembly 10.

The operation of the step assembly 10 will now be discussed in relation to the above-described components. FIGS. 1 and 2 illustrate the step assembly 10 of the present invention in its fully extended position. To retract the step assembly 10, the linear actuator 42 begins retracting the center tread assembly 24 linearly inward relative to the housing 12. The lower tread assembly 34 is connected to the center tread assembly 24 by the rotational connection pins 30, and thus, the lower tread assembly also initially retracts linearly with respect to the housing 12. The upper tread assembly 18, which is being supported by the upper ends of the pairs of linkage arms 14 and 16 at pivot axes 14b and 16b, is initially unaffected by the linear inward retraction of the center tread assembly 24 due to the sliding engagement of these two tread assemblies via the slideway assembly 26.

As the center tread assembly 24 continues its retraction linearly inwardly toward and into the housing 12, the center tread assembly inward end 44 "bottoms" against the upper tread assembly inward end 46, causing the upper tread assembly 18 to also retract inward into the housing 12. Since the upper tread assembly 18 is connected to the housing 12 by pivot arms 14 and 16, the upper tread assembly 18 rotationally retracts into the housing 12 as the pivot arms 14 and 16 rotate in a counter-clockwise direction through a vertical orientation as shown in FIG. 3. At this stage, the center tread assembly 24 has nested within the upper tread assembly 18. Since the upper tread assembly 18 and center tread assembly 24 are slidably engaged with each other only in the inward/outward direction, the rotational retraction of the upper tread assembly 18 causes the previously substantially linear retraction of the center tread assembly 24 and lower tread assembly 34 to acquire a rotational component to the retraction.

As shown in FIG. 3, when the nested upper and center tread assemblies 18 and 24 have moved inwardly far enough, the inward lower edge 50 of the lower tread assembly 34 bears against a retraction rotation pin 60, which is near the pin that couples the lower end of pivot arm 16 to the housing 12 at pivot axis 16a. This causes the lower tread assembly 34 to rotationally retract into the housing 12 (in the counter-clockwise direction as shown in FIG. 3) about its pivot axis at the rotational connection pin 30. Upon further retraction of the nested upper and center tread assemblies 18 and 24, the lower tread assembly 34 further pivots in the counterclock-wise direction to the fully retracted, substantially vertical position shown in FIG. 4. As shown in FIGS. 2–4, the lower tread assembly 34 is horizontally oriented in its fully extended position and rotates in a counter-clockwise motion about rotational connection pin 30 into a substantially vertical orientation when its fully retracted position is reached.

The step assembly 10 is fully retracted when the inward flange or lip of the upper step 20 "bottoms" against an upper inward flange that connects the upper wall 13 to the inward wall 19 of the housing 12 (as shown in FIG. 4). This results in the upper center and lower tread assemblies all being completely nested within the housing 12, and the lower tread assembly 34 reaching its vertical position with the lower surface 58 of the lower tread assembly 34 facing outwardly. Further, at this fully retracted position the upper surface 40 of the lower tread assembly 34 "bottoms" against the outward edge 61 of the center tread assembly 24. The lower surface 58 of the lower tread assembly 34 thereby substantially closes off the housing 12, essentially forming a housing outward wall. The lower surface 58 preferably is finished in an aesthetically desirable manner so as to give a pleasing appearance to the fully retracted step assembly 10. The finish of the lower surface 58 may match the exterior finish of the vehicle on which the step assembly is mounted. Alternatively, as noted above, the lower surface 58 may accept a panel or coating that matches or is complementary to the exterior of the vehicle. Typically, retractable recreational vehicle steps are rather unsightly when in a retracted position.

Extension of the step assembly 10 is generally accomplished by reversing the above-described sequence, with the center step assembly 24 being extended by way of the linear actuator 42. There are however, a few other components which come into play during the extension of the step assembly 10 that will be described below. The initial extension of the center tread assembly 24 by the linear actuator 42, causes the outward edge 61 of the center tread assembly 24 to push against the upper surface 40 of the lower tread assembly 34, thus initiating downward rotation and extension (in a clockwise motion when viewed from FIGS. 2–4) of the lower tread assembly 34 about the rotational connection pin 30. The rotational extension of the lower tread assembly 34 is first controlled by the inward lower edge 50 of the lower tread assembly 34 bearing against the retraction rotation pin 60 of the housing 12. As the extension of the step assembly 10 continues, the lower tread assembly 34 is finally halted such that the lower step 40 is oriented substantially horizontally, by the outward edge 39 of the lower tread assembly pivot arm 38 bearing against the stop pin 32 of the center tread assembly 24.

The initial extension of the center tread assembly 24 does not affect the upper tread assembly 18 which remains stationary with respect to the housing 12. After sufficient extension of the center tread assembly 24 out of the housing 12 a rear wall clasp 62 that is attached to the center tread assembly inward end 44, bears against an outward wall clasp 48 that is attached to each of the sidewalls 22 of the upper tread assembly 18. The contact of the rear wall clasp 62 of the center tread assembly 24 against the outward wall clasp 48 of the upper tread assembly 18, results in the upper tread assembly 18 being extended in unison with the center tread assembly 24 for the remainder of the center tread assembly's extension. In this respect, the upper, center and lower tread assemblies are all extended by the linear actuator's extension of the center tread assembly 24.

The present invention has been described in relation to a preferred embodiment. One of ordinary skill, after reading the foregoing specification, may be able to effect various other changes, alterations, and substitutions or equivalents thereof without departing from the concepts disclosed. It is therefore intended that the scope of the Letters Patent granted hereon be limited only by the definitions contained in the appended claims and equivalents thereof The embodiments of the invention in which an exclusive property or privilege is claimed are defined as follows:

1. A self-concealing step assembly mountable to a recreational vehicle, the step assembly comprising:
   a mountable housing;
   a plurality of attachment arms that are pivotally connected to the mountable housing;
   an actuator attached to the mountable housing;
   a plurality of tread assemblies having an extended and retracted position, the plurality of tread assemblies nestable within the mountable housing in the retracted position and extendible outwardly therefrom, wherein one of the plurality of tread assemblies is directly coupled to the actuator for translationally extending and retracting the directly coupled tread assembly relative to the housing, and wherein the other of the plurality of tread assemblies are operatively associated with the actuator by way of the directly coupled tread assembly for rotationally extending and retracting the other of the plurality of tread assemblies in unison with a translational extending and retracting of the directly coupled tread assembly; and
   the plurality of tread assemblies including a lowermost tread assembly having, a tread lower surface, the tread lower surface rotatable from the extended position to the retracted position, wherein retraction of the plurality of tread assemblies causes the tread lower surface of the lowermost tread assembly to rotate from the extended position to the retracted position to substantially conceal the other of the plurality of tread assemblies, the retracted position of the tread lower surface of the lowermost tread assembly being substantially transverse to the extended position of the tread lower surface of the lowermost tread assembly.

2. A self-concealing step assembly mountable to a recreational vehicle, the step assembly comprising:

a mountable housing;

a plurality of attachment arms that are pivotally connected to the mountable housing;

an actuator attached to the mountable housing;

a plurality of tread assemblies nestable within the housing and extendable therefrom, wherein one of the plurality of tread assemblies is directly coupled to the actuator for translationally extending and retracting the directly coupled tread assembly relative to the housing, and wherein the other of the plurality of tread assemblies are operatively associated with the actuator by way of the directly coupled tread assembly for rotationally extending and retracting the other of the plurality of tread assemblies in unison with a translational extending and retracting of the directly coupled tread assembly;

the plurality of tread assemblies including a lowermost tread assembly having a tread lower surface, wherein retraction of the plurality of tread assemblies causes the tread lower surface of the lowermost tread assembly to substantially conceal the step assembly within the mountable housing; and a slideway assembly having portions mounted to one of the other of the plurality of tread assemblies and having portions mounted to the directly coupled tread assembly whereby the directly coupled tread assembly is slidable relative to the one of the other of the plurality of tread assemblies.

3. The step assembly of claim 2, wherein the directly coupled tread assembly includes a rear clasp, and the one of the other of the plurality of tread assemblies includes a rear wall stop, such that retraction of the directly coupled tread assembly causes the rear clasp to bear against the rear wall stop, and retract the one of the other of the plurality of tread assemblies.

4. The step assembly of claim 2, wherein the directly coupled tread assembly includes a rear clasp, and the one of the other of the plurality of tread assemblies includes a front wall clasp, such that extension of the directly coupled tread assembly causes the rear clasp to bear against the front wall clasp, and extend the one of the other of the plurality of tread assemblies.

5. The step assembly of claim 1, wherein extension of the directly coupled tread assembly causes the directly coupled tread assembly to bear against the lowermost tread assembly, so as to cause the lowermost tread assembly to extend by rotating downward.

6. The step assembly of claim 5, wherein:

the directly coupled tread assembly contains a lower portion that includes a pivot axis about which the lowermost tread assembly pivots, and a pivot arm stop; and the pivot arm stop halts the downward rotation of the lowermost tread assembly about the pivot axis during the extension of the step assembly such that the tread lower surface is oriented substantially horizontal.

7. A self-concealing step assembly mountable to a recreational vehicle, the step assembly comprising:

a mountable housing;

a plurality of attachment arms that are pivotally connected to the mountable housing;

an actuator attached to the mountable housing;

a plurality of tread assemblies nestable within the housing and extendable therefrom, wherein one of the plurality of tread assemblies is directly coupled to the actuator for translationally extending and retracting the directly coupled tread assembly relative to the housing, and wherein the other of the plurality of tread assemblies are operatively associated with the actuator by way of the directly coupled tread assembly for rotationally extending and retracting the other of the plurality of tread assemblies in unison with a translational extending and retracting of the directly coupled tread assembly; and the plurality of tread assemblies including a lowermost tread assembly having a tread lower surface, wherein retraction of the plurality of tread assemblies causes the tread lower surface of the lowermost tread assembly to substantially conceal the step assembly within the mountable housing, and wherein the lower most tread assembly contains a rear edge portion, and the housing contains a retraction rotation pin, such that retraction of the step assembly into the housing causes the rear edge portion of the lower most tread assembly to bear against the retraction rotation pin and rotate the lower most step assembly upwards into a retracted substantially vertical position.

8. The step assembly of claim 1, wherein the tread lower surface of the lowermost tread assembly is configured to function as an aesthetically appealing outer surface to the housing of the step assembly when the step assembly is fully retracted.

9. A fully retractable, self-concealing step assembly, comprising:

a mountable housing having an upper wall, a lower wall, sidewalls, and a plurality of attachment arms;

an upper tread assembly including and an upper step, wherein the upper tread assembly is operatively connected to the plurality of attachment arms;

a center tread assembly including a center step;

a slideway assembly having portions mounted to the upper tread assembly and having portions mounted to the center tread assembly whereby the center tread assembly is slidable relative to the upper tread assembly;

a lower tread assembly including a lower step and a pivot arm supporting the lower step, wherein the lower tread assembly is rotatably connected to the center tread assembly by the pivot arm; and an actuator for actuating said upper, center, and lower tread assemblies, so that when the linear actuator is powered the center tread assembly retracts into the mountable housing and draws the upper and lower tread assemblies into the mountable housing, while rotating the lower step assembly such that the lower step substantially conceals the retracted step assembly.

10. The step assembly of claim 9, wherein the mountable housing includes two pairs of attachment arms, said attachment arms containing upper and lower ends, and wherein two attachment arms are rotatably coupled to each housing sidewall near the housing lower wall.

11. The step assembly of claim 10, wherein the two pairs of rotatably coupled attachment arms extend upward from the mountable housing sidewalls near the housing lower wall, to the upper tread assembly to which the upper ends of the attachment arms are rotatably coupled.

12. The step assembly of claim 9, wherein extension of the center tread assembly causes the center tread assembly to bear against the lower tread assembly, so as to cause the lower tread assembly to extend by rotating downward.

13. The step assembly of claim 12, wherein:
the center tread assembly contains a lower portion that includes a pivot axis about which the pivot arm of the lower tread assembly pivots, and a pivot arm stop; and
the pivot arm stop halts the downward rotation of the lower tread assembly about the pivot axis during the extension of the step assembly such that the lower step is oriented substantially horizontal.

14. The step assembly of claim 13, wherein the pivot arm of the lower tread assembly contains a rear edge portion, and a sidewall of the mountable housing contains a retraction abutment, such that retraction of the step assembly into the mountable housing causes the rear edge portion of the lower tread assembly to bear against the retraction abutment and rotate the lower step assembly upwards into a retracted substantially vertical position.

15. The step assembly of claim 9, wherein the lower step contains a bottom surface that is configured to function as an aesthetically appealing outer surface to the housing of the step assembly when the step assembly is fully retracted.

16. The step assembly of claim 9, wherein the lower step contains a bottom surface that is configured to accept an aesthetically appealing outer surface, which functions as the outer surface to the housing of the step assembly when the step assembly is fully retracted.

17. The step assembly of claim 9, wherein the upper, center, and lower step assemblies are sized and shaped so that the assemblies can be retracted completely within the mountable housing.

18. The step assembly of claim 9, wherein the center tread assembly includes a rear clasp, and the upper tread assembly includes a rear wall stop, such that retraction of the center tread assembly causes the center tread assembly rear clasp to bear against the upper tread assembly rear wall stop, and retract the upper tread assembly.

19. The step assembly of claim 9, wherein the center tread assembly includes a rear clasp, and the upper tread assembly includes a front wall clasp, such that extension of the center tread assembly causes the center tread assembly rear clasp to bear against the upper tread assembly front wall clasp, and extend the upper tread assembly.

20. The step assembly of claim 9, wherein the actuator directly engages only the center tread assembly, such that the center tread assembly is retracted and extended substantially linearly out of and into the mountable housing.

21. The step assembly of claim 9, wherein the actuator is indirectly operatively associated with the upper and lower tread assemblies via the center tread assembly, such that the linear extension and retraction of the center tread assembly causes the rotating extension and retraction of the upper and lower tread assemblies.

22. A self-concealing step assembly mountable to a recreational vehicle, the step assembly comprising:
a step assembly housing having an upper wall, a lower wall, and sidewalls;
at least two linkage arms that are pivotally connected to the step assembly housing;
an upper tread assembly, center tread assembly, and lower tread assembly respectively including an upper step, center step, and lower step;
an actuator for extending and retracting the step assembly, wherein the center tread assembly is operated on by the actuator for translationally extending the center tread assembly outwardly of the housing and retracting the center tread assembly into the housing, and wherein the upper and lower tread assemblies are operatively associated with the actuator by way of the center tread assembly for rotationally extending and retracting the upper and lower tread assemblies in unison with the translational extending and retracting the center tread assembly; and
the lower tread assembly including a lower surface, wherein retraction of the step assembly causes the lower surface to substantially conceal the step assembly retracted into the housing.

23. The step assembly of claim 22, wherein the step assembly housing includes two pairs of linkage arms, said linkage arms containing upper and lower ends, and wherein two linkage arms are rotatably coupled to each housing sidewall.

24. The step assembly of claim 23, wherein the two pairs of operatively connected linkage arms extend diagonally upward from the housing sidewalls near the housing lower wall, to the upper tread assembly to which the upper ends of the linkage arms are rotatably coupled.

25. The step assembly of claim 22, further containing a slideway assembly having portions mounted to the upper tread assembly and having portions mounted to the center tread assembly whereby the center tread assembly is slidable relative to the upper tread assembly.

26. The step assembly of claim 22, wherein extension of the center tread assembly causes the center tread assembly to bear against the lower tread assembly, so as to cause the lower tread assembly to extend by rotating downward.

27. The step assembly of claim 26, wherein:
the center tread assembly contains a lower portion that includes a pivot axis about which the pivot arm of the lower tread assembly pivots, and a pivot arm stop; and
the pivot arm stop halts the downward rotation of the lower tread assembly about the pivot axis during the extension of the step assembly such that the lower step is oriented substantially horizontal.

28. The step assembly of claim 22, wherein the pivot arm of the lower tread assembly contains a rear edge portion, and a stop is mounted on a sidewall of the housing whereby retraction of the step assembly into the housing causes the rear edge portion of the lower tread assembly to bear against the stop and thereby rotate the lower step assembly upwards into a retracted substantially vertical position.

29. The step assembly of claim 28, wherein the stop also pivotally couples one of the linkage arms to the step assembly housing.

30. The step assembly of claim 22, wherein the lower step contains a bottom surface that is configured to function as an aesthetically appealing outer surface to the housing of the step assembly when the step assembly is fully retracted.

31. The step assembly of claim 22, wherein the lower step contains a bottom surface that is configured to accept an aesthetically appealing surface which functions as the outer surface to the housing of the step assembly when the steps assembly is fully retracted.

32. The step assembly of claim 22, wherein the upper, center, and lower step assemblies are sized and shaped so that the assemblies can be retracted completely within the step assembly housing.

33. The step assembly of claim 22, wherein the center tread assembly includes a rear clasp, and the upper tread assembly includes a rear wall stop, such that retraction of the center tread assembly causes the center tread assembly rear clasp to bear against the upper tread assembly rear wall stop, and retract the upper tread assembly.

34. The step assembly of claim 22, wherein the center tread assembly includes a rear clasp, and the upper tread assembly includes a front wall clasp, such that extension of the center tread assembly causes the center tread assembly rear clasp to bear against the upper tread assembly front wall clasp, and extend the upper tread assembly.

* * * * *

UNITED STATES PATENT AND TRADEMARK OFFICE
CERTIFICATE OF CORRECTION

PATENT NO.   : 6,213,486 B1
DATED         : April 10, 2001
INVENTOR(S)  : J.R. Kunz et al.

It is certified that error appears in the above-identified patent and that said Letters Patent is hereby corrected as shown below:

<u>Title page,</u>
Item [56], References Cited, U.S. PATENT DOCUMENTS,
"Garret" should read -- Garrett --

<u>Column 8,</u>
Line 61, "having, a" should read -- having a --

<u>Column 10,</u>
Lines 19 and 23, "lower most" should read -- lowermost --
Lines 24-25, "lower
             most" should break -- lower-
             most --
Line 36, "including and an" should read -- including an --

<u>Column 12,</u>
Line 56, "when the steps" should read -- when the step --

Signed and Sealed this

Seventh Day of May, 2002

Attest:

Attesting Officer

JAMES E. ROGAN
Director of the United States Patent and Trademark Office